(12) United States Patent
Sokolowski

(10) Patent No.: US 7,306,413 B1
(45) Date of Patent: Dec. 11, 2007

(54) VEHICLE RESTRAINT APPARATUS AND TRAILER INCORPORATING THE SAME

(76) Inventor: Robert A. Sokolowski, 106 Beverly Dr., Harrison, MI (US) 48625

( * ) Notice: Subject to any disclaimer, the term of this patent is extended or adjusted under 35 U.S.C. 154(b) by 121 days.

(21) Appl. No.: 11/105,964

(22) Filed: Apr. 14, 2005

Related U.S. Application Data

(60) Provisional application No. 60/562,657, filed on Apr. 15, 2004.

(51) Int. Cl.
*B60P 7/08* (2006.01)

(52) U.S. Cl. .................. 410/7; 410/2; 410/3; 410/19

(58) Field of Classification Search .................. 410/2, 410/3, 7, 9, 19, 22, 80; 224/403, 533, 552, 224/567; 248/500, 503
See application file for complete search history.

(56) References Cited

U.S. PATENT DOCUMENTS

| | | | |
|---|---|---|---|
| 4,222,698 A | 9/1980 | Boelter | |
| 4,273,351 A | 6/1981 | Salamander | |
| 4,683,970 A | 8/1987 | Smith | |
| 5,230,526 A | 7/1993 | Jolivet | |
| 5,259,720 A | 11/1993 | Lobner | |
| 5,267,746 A | 12/1993 | Stevenson | |
| 5,553,882 A | 9/1996 | Unruh | |
| 5,593,260 A | 1/1997 | Zimmerman | |
| 5,607,270 A | 3/1997 | Zimmerman | |
| 5,687,978 A | 11/1997 | Rhodes et al. | |
| 5,716,175 A | 2/1998 | Fenske et al. | |
| 5,749,685 A | 5/1998 | Hain | |
| 5,785,471 A | 7/1998 | Godbersen | |
| 5,810,546 A | 9/1998 | Schmoling | |
| 5,816,757 A | 10/1998 | Huston | |
| 5,833,412 A * | 11/1998 | Valencia et al. ............. 410/2 |
| 6,050,737 A | 4/2000 | Russell | |
| 6,059,496 A | 5/2000 | Stevens | |
| 6,068,432 A | 5/2000 | Schifsky | |
| 6,077,004 A * | 6/2000 | Denman, Jr. .................. 410/8 |
| 6,099,218 A | 8/2000 | Ferrari | |
| 6,099,219 A | 8/2000 | Bartholomay | |
| 6,139,235 A | 10/2000 | Vander Koy et al. | |
| 6,164,882 A | 12/2000 | Selle | |

* cited by examiner

*Primary Examiner*—Stephen Gordon
(74) *Attorney, Agent, or Firm*—John D. Wright; Dickinson Wright PLLC

(57) ABSTRACT

A trailer and vehicle restraining apparatus therefore providing secure attachment of at least one vehicle to the trailer. The apparatus has a body with a flange extending outwardly therefrom with a restraining member being received for slidable movement along at least a portion of the body between a receiving position and a restraining position. A finger extends outwardly from the restraining member for movement relative to the flange. When the restraining member is in its receiving position, a first gap is defined between the finger and the flange, and when the restraining member is in its restraining position, a second gap is defined between the finger and the flange. The second gap is less than the first gap to facilitate restraining the vehicle to the trailer.

11 Claims, 5 Drawing Sheets

VEHICLE RESTRAINT APPARATUS AND TRAILER INCORPORATING THE SAME

REFERENCE TO CO-PENDING APPLICATION

This application claims the benefit of U.S. Provisional Application Ser. No. 60/562,657, filed Apr. 15, 2004.

BACKGROUND OF THE INVENTION

1. Field of the Invention

This invention relates generally to trailers for transporting recreational vehicles, and more particularly to devices for restraining recreational vehicles to trailers.

2. Related Art

Trailers are often used to transport recreational vehicles, such as snowmobiles or all-terrain vehicles (ATV's), for example. In the case of snowmobiles, typically a bar spans across the tops of the snowmobile skis to clamp the skis to a platform of the trailer. The bar is commonly clamped on the skis with the use of a threaded rod extending upwardly from the platform between the skis. A nut is generally fastened to the rod to draw the bar toward the platform to pinch the skis between the bar and the platform of the trailer. Typically, the threaded bar becomes corroded, often causing the threads to become cross-threaded and nonfunctional. In addition, as a result of the main body of the snowmobile being able to bounce in relation to the fastened skis, typically the rear end of the snowmobile requires additional fastening to secure the snowmobile to the trailer.

In the case of an ATV, it is common to tie down the front and back of the ATV with a series of straps or chains. Straps tend to stretch over time, thereby causing the ATV to shift or move in relation to the trailer, while chains typically become corroded and can cause damage to the ATV, such as by scratching or denting the vehicle. In addition, the straps and chains can be cumbersome and time consuming while attempting to fasten the vehicle to the trailer. Further, to avoid a potential hazard, the straps and chains must either be removed from the trailer while not in use, or otherwise secured so that they do not move freely about when not in use.

SUMMARY OF THE INVENTION

A trailer and vehicle restraining apparatus therefore improves the ease and reliability of restraining recreational vehicles to a platform of a trailer. The restraining apparatus has a body with a flange extending outwardly therefrom. A restraining member is received for slidable movement along at least a portion of the body between a receiving position and a restraining position. The restraining member has a finger extending outwardly therefrom for movement relative to the flange. When the restraining member is in its receiving position, a first gap is defined between the finger and the flange, and when the restraining member is in its restraining position, a second gap is defined between the finger and the flange. The first gap, established in the receiving position, is greater than the second gap, established in the restraining position.

The vehicle restraining apparatus is readily attachable to a platform of a trailer, while also being readily removable while not in use. The vehicle, whether a snowmobile, ATV, or the like, is positioned adjacent to the body of the restraining apparatus, and thereafter, the restraining member is moved to its restraining position to capture a portion of the vehicle. Desirably, the restraining member and the flange capture a portion of the vehicle's frame to restrain the vehicle for secure attachment to the platform of the trailer. To release the vehicle from its secured attachment to the trailer, the restraining member is moved to its receiving position, thus, allowing the vehicle to be moved away from the restraining member and off the trailer.

Some of the objects, features and advantages of the embodiments disclosed herein include providing a trailer with a vehicle restraining apparatus for secure and reliable attachment of a recreational vehicle thereto, providing a vehicle restraining apparatus that is easily adaptable for attachment to a trailer, is easily removable from a trailer, minimizes the potential for damage to a vehicle resulting from restraining the vehicle to the trailer, reduces the need for secondary attachment devices to secure a vehicle to a trailer, reduces the likelihood of an accident while loading a vehicle onto a trailer, is adaptable to a variety of different recreational vehicle configurations, is economical in manufacture, of relatively simple design and use, is durable, and provides a long and useful life.

BRIEF DESCRIPTION OF THE DRAWINGS

These and other objects, features and advantages will become readily apparent from the following detailed description of the presently preferred embodiments and best mode, appended claims and accompanying drawings, in which:

DETAILED DESCRIPTION OF THE PREFERRED EMBODIMENTS

Figure 1:
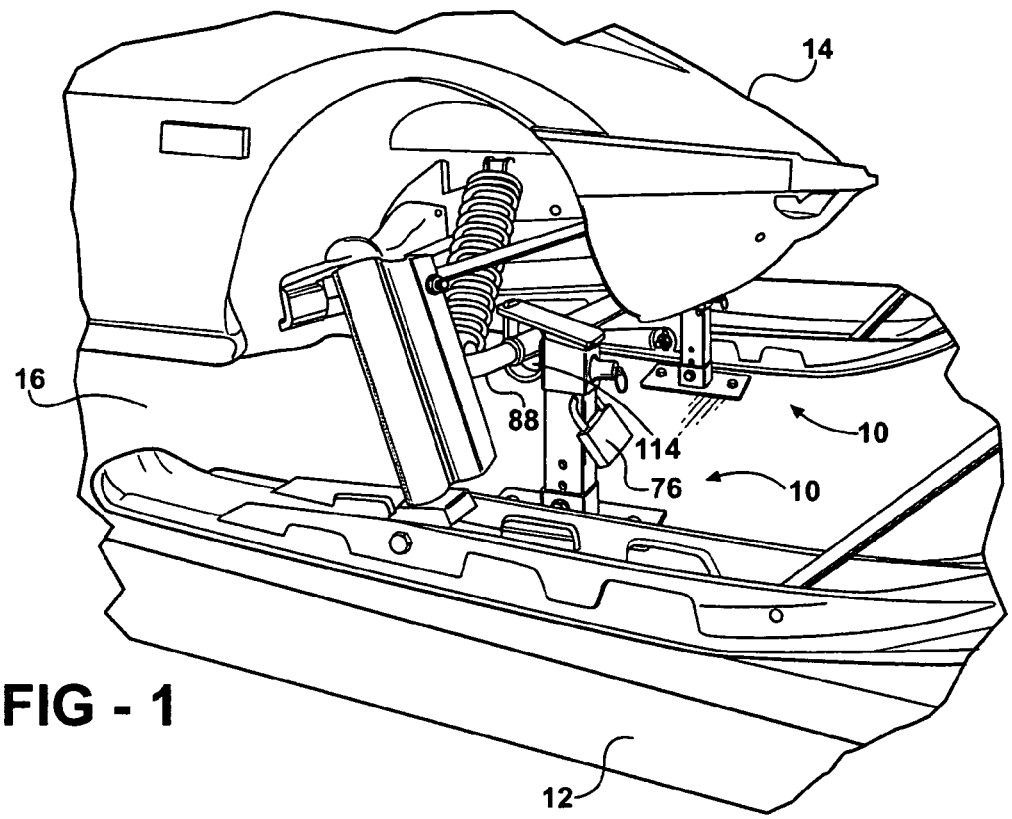
FIG. 1 is a partial perspective view of a trailer with a recreational vehicle restrained thereon by a vehicle restraining apparatus constructed according to one embodiment of the invention.

Referring in more detail to the drawings, FIG. 1 shows at least one, and shown here as a pair of vehicle restraint apparatus 10, referred to as apparatus hereafter, constructed according to one embodiment of the invention. The apparatus 10 are attached to a trailer 12 for restraining a recreational vehicle 14, such as a snowmobile, for example, to a platform 16 of the trailer 12. The apparatus 10 is moved to a receiving position (FIGS. 3 and 7) to allow the vehicle 14 to be quickly and easily secured to the platform 16. Thereafter, the apparatus 10 is then moved to a restraining position (FIGS. 4 and 8) to complete the secure attachment of the vehicle 14 to the platform 16. To quickly and easily remove the vehicle 14 from the trailer 12, the apparatus 10 is moved back to its receiving position, which in this case, can also be called a releasing position, to allow the vehicle 14 to be removed from the apparatus 10 and off the platform 16 of the trailer 12.

Figure 1A:
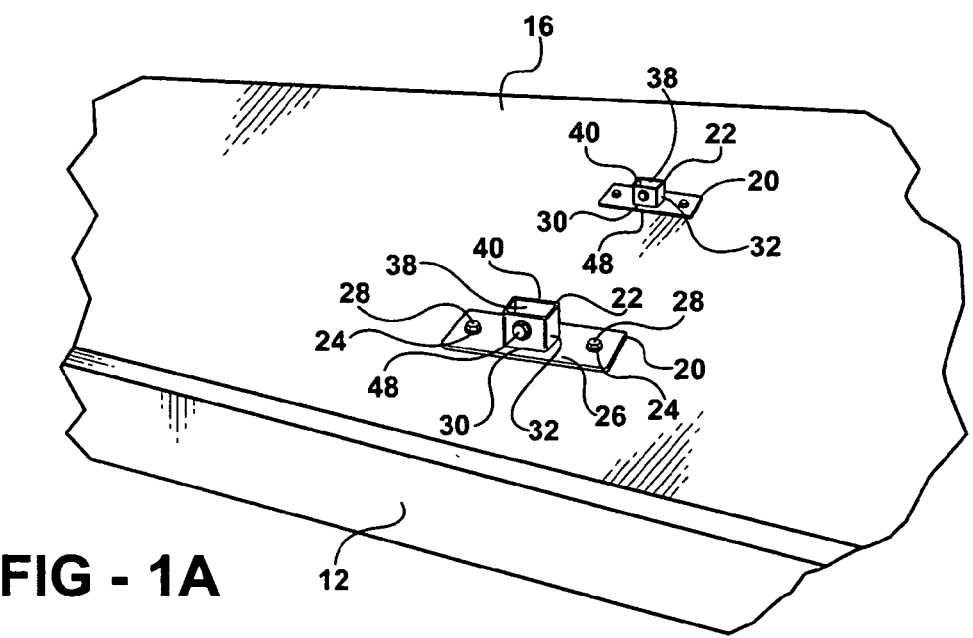
FIG. 1A is a view similar to FIG. 1 with the recreational vehicle and a portion of the restraining apparatus removed from the trailer.
Figure 2:
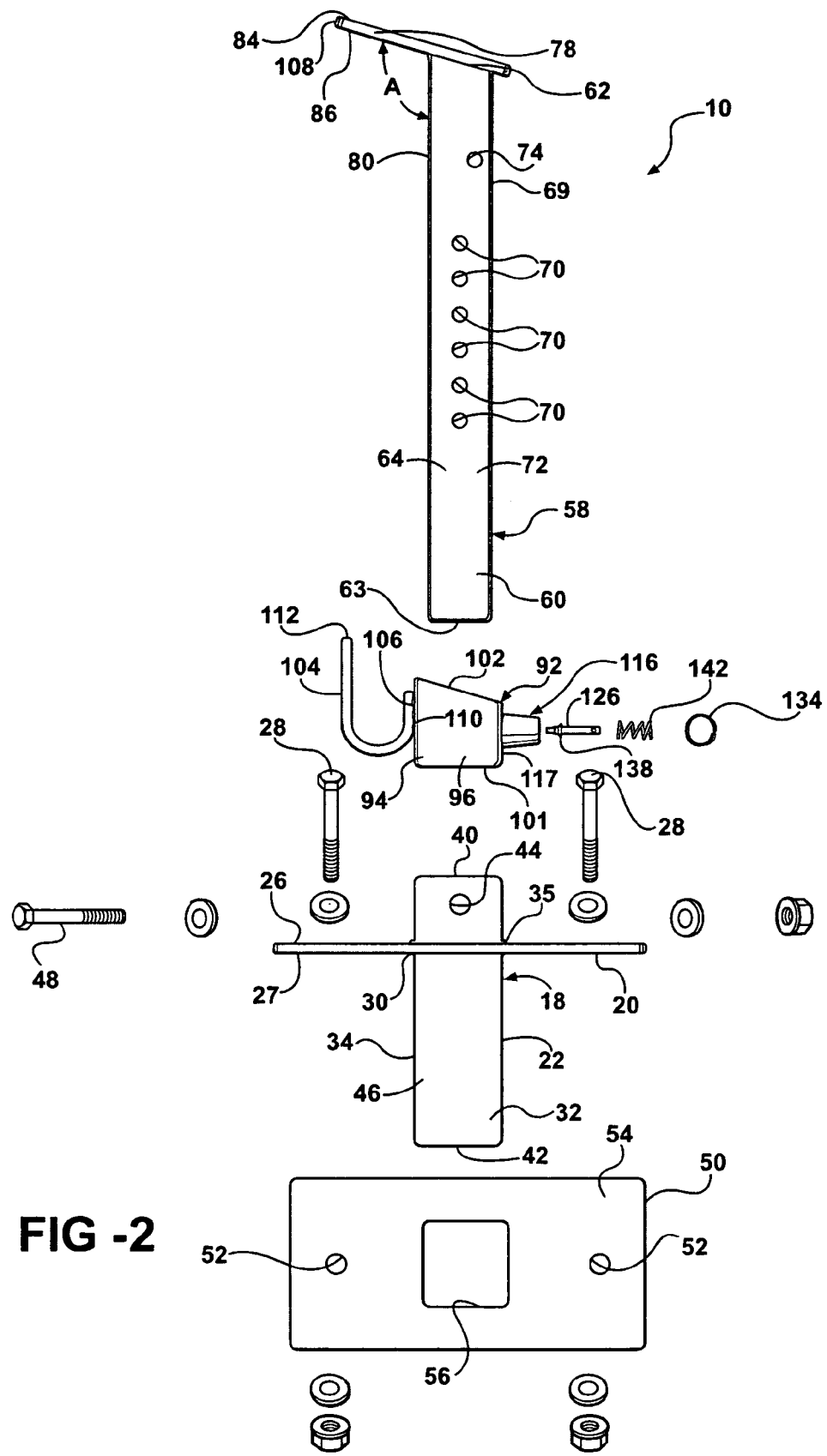
FIG. 2 is an exploded view of the vehicle restraining apparatus of FIG. 1.
Figures 3, 4:
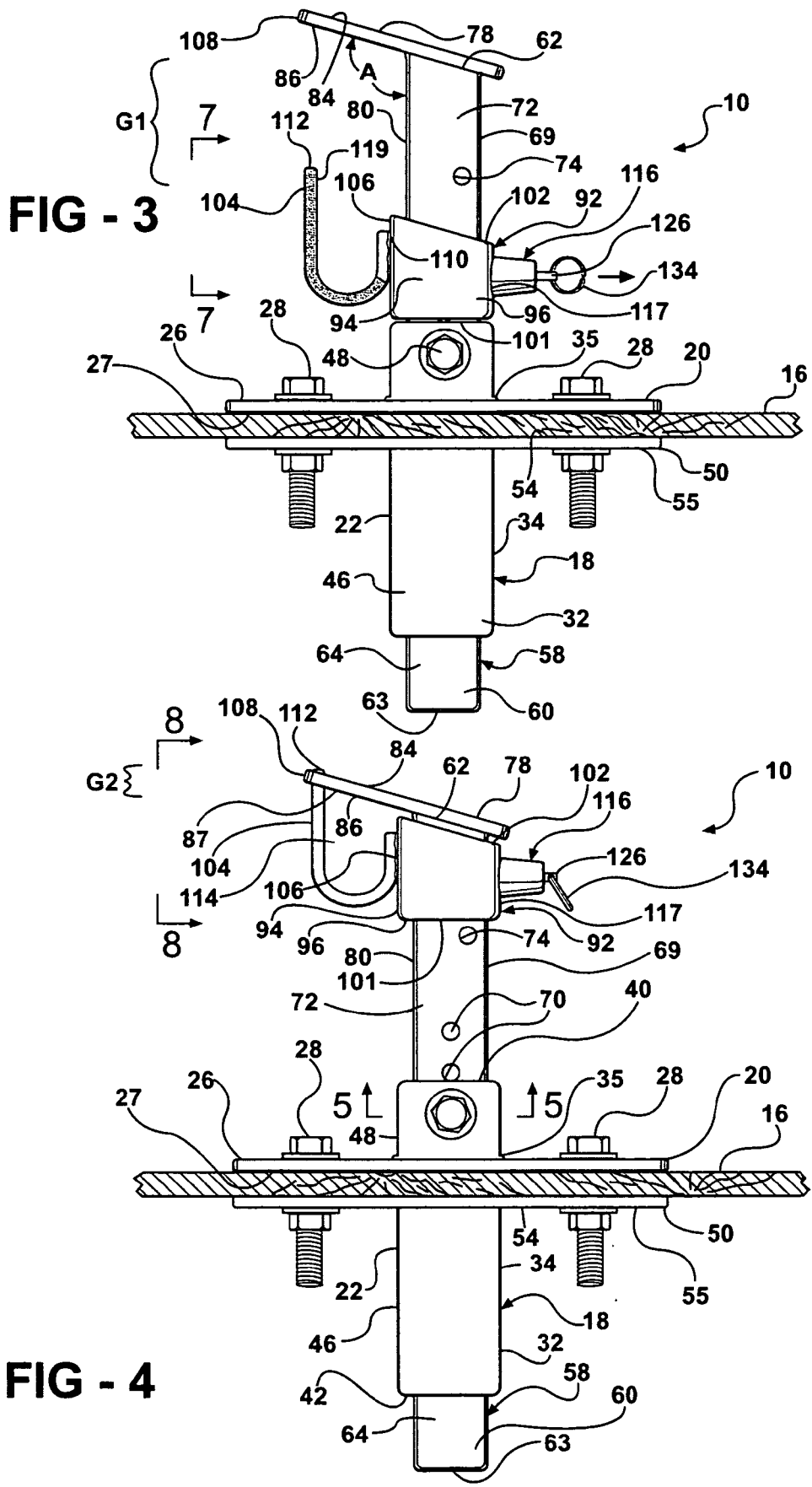
FIG. 3 is a side view of the vehicle restraining apparatus in a receiving position of FIG. 1.
FIG. 4 is a view similar to FIG. 3 with the vehicle restraining apparatus in a restraining position.

As best shown in FIGS. 2-4, the apparatus 10 has a mount fixture 18 including a mount plate 20 and a support member 22. The mount plate 20 is preferably formed as a flat piece of rigid material, such as steel or aluminum, for example. The mount plate 20 preferably has at least one and shown here as a pair of fastener openings 24 (FIG. 1A) extending between opposite sides 26, 27 of the mount plate 20, and sized to receive a pair of fasteners 28, such as standard threaded bolts, for example, to facilitate securing the mount fixture 18 to the platform 16. The mount plate 20 preferably has an opening 30 therethrough sized to receive the support member 22 for fixed attachment therein. The opening 30 is shown here as being generally square, though it should be recognized that other shapes, such as circular for example, could be used. Additionally, it should be recognized that the mount plate 20 may be formed having any desired peripheral shape, such as rectangular, square, circular or oval, for example, as best meets the intended application and force restraint requirements.

Figure 5:
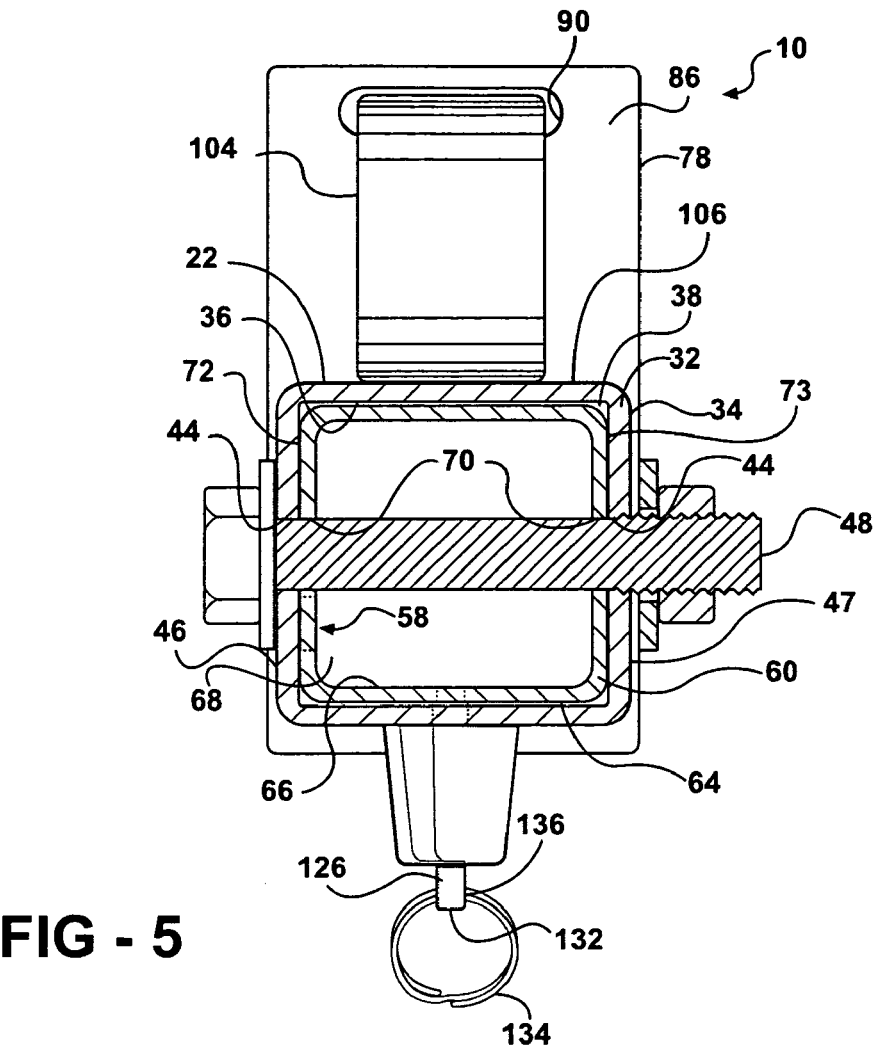
FIG. 5 is a cross-sectional view of the vehicle restraining apparatus taken generally along line 5-5 of FIG. 4.

The support member 22 is preferably formed from a tubular wall 32 of strong, durable and rigid material, such as steel or aluminum, for example. The wall 32 is shown here as being generally square in lateral cross section (FIG. 5) and has an outer surface 34 sized for a close fit within the opening 30 of the mount plate 20 so that the outer surface 34 can be attached to the mount plate 20, such as by a weld joint 35, for example. The wall 32 has an inner surface 36 defining a passage 38 (FIG. 1A) preferably extending from one end 40 of the support member 22 through to another end 42 of the support member 22. The support member 22 is preferably attached in the opening 30 of the mount plate 20 so that the mount plate 20 is generally between the ends 40, 42 of the of the support member 22. The support member 22 preferably has at least one opening extending through one side of the tubular wall and shown here as having a pair of openings 44 (FIG. 5) extending through opposite sides 46, 47 of the tubular wall 32. The openings 44 are sized to receive an adjustment pin 48 therethrough, such as a standard threaded bolt, for example, with the function of the adjustment pin 48 being discussed in more detail hereafter.

To facilitate attachment of the mount fixture 18 to the platform 16 of the trailer 12, the apparatus preferably has a base plate 50 desirably formed as a flat piece of rigid material, such as steel or aluminum, for example. The base plate 50 preferably has at least one and shown here as a pair of fastener openings 52 (FIG. 2) extending between opposite sides 54, 55 of the plate 50, wherein the openings 52 are arranged for alignment with the fastener openings 24 in the mount plate 20. The fastener openings 52 are sized to receive the fasteners 28 extending through the mount plate 20 to facilitate securing the mount fixture 18 and the base plate 50 on opposite sides of the platform 16. The base plate 50 preferably has an opening 56 therethrough sized to receive the support member 22 to facilitate assembly of the base plate 50 and the mount plate 20 in a clamped relation relative to the platform 16 of the trailer 12. The opening 56 in the base plate 50 is shown here as being generally square to accommodate the shape of the support member 22, though it should be recognized that other shapes, such as circular for example, could be used, particularly if the shape of the support member 22 is other than square. It should be recognized that the mount plate 20 and the base plate 50 are preferably secured in their clamped relation abutting the opposite sides of the platform 16 to provide a rigid and secure attachment of the mount fixture 18 to the platform 16, thereby providing a rigid and secure attachment of the apparatus 10 to the platform 16 in use.

The apparatus 10 has a body 58 preferably formed from a tubular wall 60 of strong, durable and rigid material, such as steel or aluminum, for example, though it should be recognized that the body 58 could be formed from a solid piece of material. The wall 60 is shown here as having a pair of opposite ends 62, 63 with a generally elongate midsection preferably square in lateral cross section. The wall 60 has an outer surface 64 sized at least in part for a close slidingly adjustable fit within the passage 38 of the support member 22, and an inner surface 66 defining a passage 68 extending at least partially therethrough. The body has a rear side 69 with a lock pin opening 71 therein, the function of which is discussed hereafter.

To facilitate the adjustment of the body 58 within the passage 38 of the support member 22, a plurality of adjustment openings 70 (FIG. 2) are formed in at least one and preferably a pair of opposite sides 72, 73 of the body 58. The adjustment openings 70 are oriented for alignment with the openings 44 in the support member 22 and spaced axially a sufficient distance, generally about 0.75" to 1.25" on center, for example, to allow for a select range of adjustment. Accordingly, the adjustment pin 48 extends through the openings 44 in the support member 22 and the openings 70 in the body 58 to adjustably secure the body 58 axially relative to the support member 22.

To ensure that the apparatus 10 restrains the vehicle 14 in use, preferably the body 58 has an opening 74 extending through at least one and preferably the pair of sides 72, 73 of the wall 60 for receipt of a lock member 76 (FIG. 1), such as a standard pad lock, for example. The lock member 76, when installed through the openings 74, ensures that the apparatus 10 remains in its restraining position, thereby preventing unintentional movement of the apparatus 10 from its restraining position to its receiving position. Accordingly, the lock member 76 acts as a redundant safety feature, while also acting as a deterrent from theft or tampering.

Figure 6:
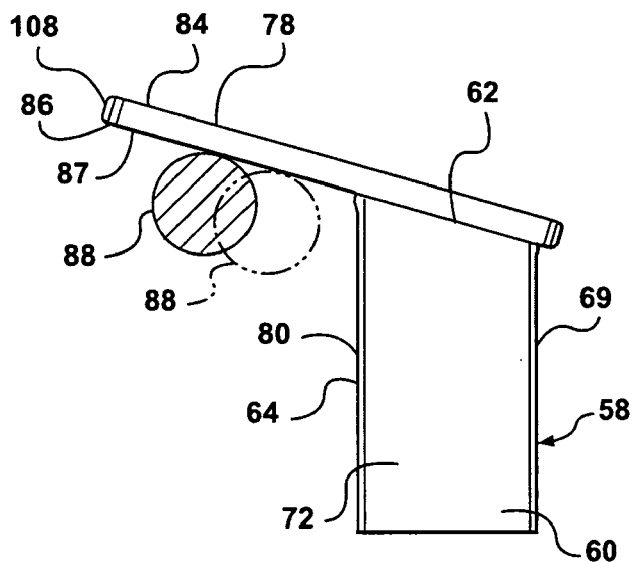
FIG. 6 is a partial side view showing a frame member from a vehicle initially engaging a flange of the vehicle restraining apparatus of FIG. 1.

The body 58 has a flange 78 extending generally laterally from a front side 80 of the wall 60, and shown here as extending generally from the end 62 of the body 58. The flange 78 has an upper surface 84 and a lower surface 86, wherein the surfaces 84, 86 are preferably oriented in an oblique relation to the front side 80 of the wall 60. The lower surface 86 is preferably oriented to define an obtuse included angle (A) (FIGS. 2, 3 and 7) between the lower surface 86 of the flange 78 and the front side 80 of the body 58, generally between 95-115° and preferably between 100-110°. As such, the lower surface 86 is oriented to act as a cam surface 87 (FIG. 6) against a portion of the vehicle 14, such as a steering rod or an A-arm 88, for example, when positioning the vehicle 14 for secure attachment within the apparatus 10. The camming action provided by the cam surface 87 facilitates removing any play or slop between the vehicle 14 and the trailer 12, thereby providing a more secure restraint of the vehicle 14. To further facilitate secure attachment of the vehicle 14 within the apparatus 10, the flange 78 preferably has an enclosed opening 90 (FIGS. 7 and 8) extending between the upper and lower surfaces 84, 86, wherein, the function of the opening 90 is discussed detail hereafter.

The apparatus 10 has a restraining member 92 preferably formed at least in part from a tubular wall 94 of strong, durable and rigid material, such as steel or aluminum, for example. The wall 94 has an outer surface 96 and an inner surface 98 (FIGS. 7 and 8) defining a passage 100 extending therethrough with the passage 100 being sized for a close sliding fit about the outer surface 64 of the body 58 while moving between the receiving position (FIG. 3) and the restraining position (FIG. 4). The wall 94 has a lower end 101 and an upper end 102 preferably inclined at the same angle as the flange 78. The restraining member 92 has a finger 104 extending generally outwardly from a front side 106 of the wall 94. The finger 104 is preferably constructed from a separate piece of strong, durable and rigid material, such as steel, and formed into a generally U-shaped configuration with one side presenting a surface 110 for attachment to the wall 94, such as through a weld joint, for example. The finger 104 is generally formed to accept a range of A-arm sizes, including, by way of example and without limitations, a standard 1½" diameter A-arm. The finger 104 extends to a free end 112 preferably sized for receipt in the opening 90 in the flange 78 when the restraining member 92 is in its restraining position. To facilitate the finger 104 being received in the opening 90, the free end 112 preferably extends beyond an imaginary plane (P) (FIG. 8) defined by a projection from a free end 108 of the flange 78. Accordingly, when the restraining member 92 is in its restraining position, with the upper end 102 of the restraining member 92 generally abutting or adjacent the flange 78, the free end 112 extends at least partially into the opening 90 to fully enclose the A-arm 88 of the vehicle 14 within an enclosed opening 114 defined between the flange 78, the finger 104 and the body 58 of the apparatus 10. To inhibit scratching the A-arm 88, desirably the finger 104 has a sleeve 119 (FIG. 7), preferably constructed from a durably compliant material, such a nylon or polyethylene, for example, received on the finger 104. It should be recognized that instead of a sleeve, the surface 119 could be presented by a coating of the aforementioned material, with the coating being applied over at least a portion of the finger 104. In addition, the user may elect to wrap a piece of the material around the A-arm 88. Further, it should be recognized that the cam surface 87 could also have a sleeve or a coating applied thereon.

Figure 7:
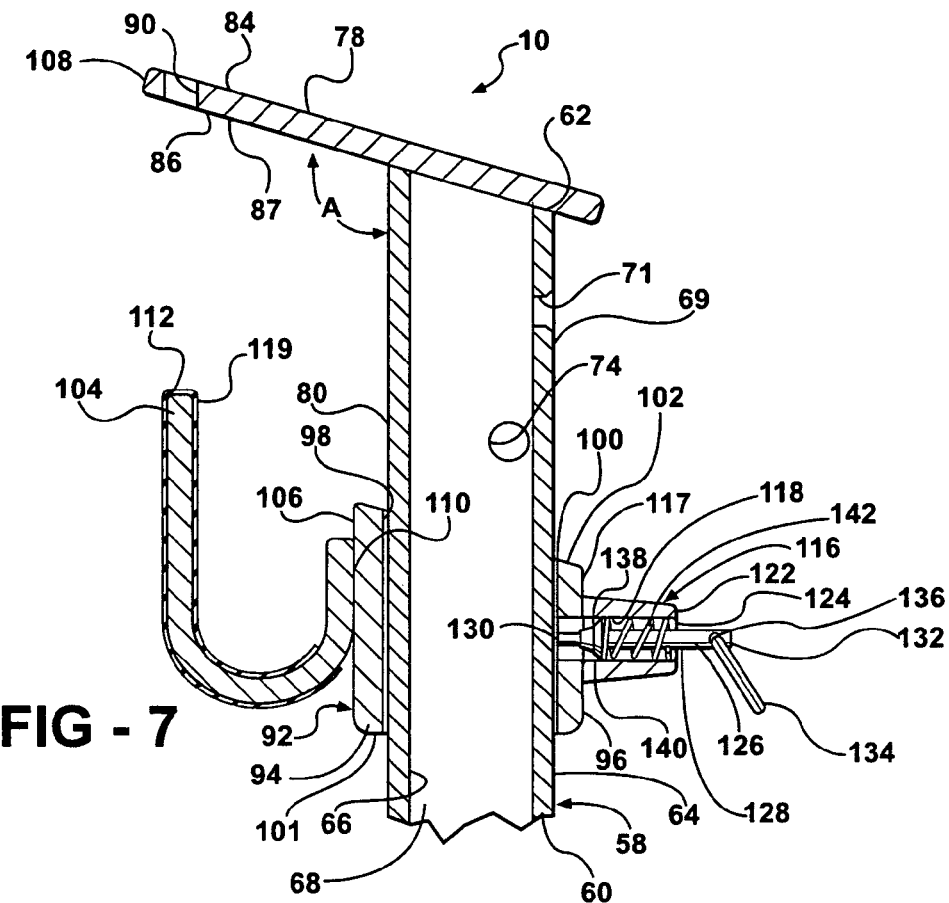
FIG. 7 is a partial cross-sectional view taken generally along line 7-7 of FIG. 3.
Figure 8:
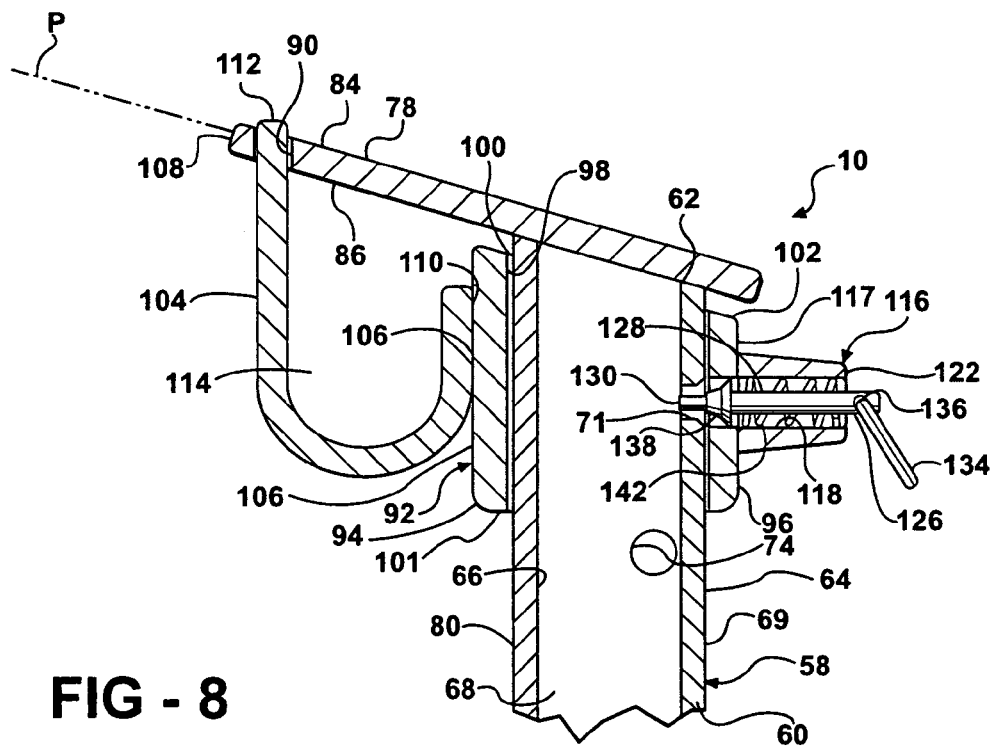
FIG. 8 is a view similar to FIG. 7 taken generally along line 8-8 of FIG. 4.

The restraining member 92 has a lock housing 116 carried by another side, shown here as a rear side 117 of the restraining member 92. As shown in FIGS. 7 and 8, the lock housing 116 has a generally cup-shaped body defining an inner cavity 118 with one end arranged for attachment, such as through a weld joint, for example, to the restraining member 92. The body also has a free end 122 with an opening 124 passing into the inner cavity 118 for receiving a lock pin 126 for movement between a retracted position (FIG. 7) and an extended position (FIG. 8).

The lock pin 126 preferably has a generally cylindrical outer surface 128 in lateral cross-section and has one end 130 sized for receipt in the lock pin opening 71 of the body 58 to secure the restraining member 92 in its restraining position. Another end 132 of the lock pin 126 preferably has a pull device, such as a ring 134 fastened through a passage 136 adjacent the end 132 of the lock pin 126, for example, to facilitate commanded movement of the lock pin 126 between its extended engaged position and retracted disengaged position. The lock pin 126 has an enlarged annular boss 138 extending radially outwardly from the outer surface 128 and located generally between the ends 130, 132 of the lock pin 126. The boss 138 has a perimeter 140 sized for sliding receipt in the inner cavity 118 of the housing 116 and for engagement with a spring member 142, such as a coil spring, for example.

The spring member 142 is received about the outer surface 128 of the lock pin 126 between the boss 138 and the end 122 of the housing 116. The spring member 142 preferably acts against the boss 138 and the end 122 of the housing 116 to bias the lock pin 126 to its extended position. Accordingly, the end 130 of the lock pin 126 is biased into engagement with the rear side 69 of the body 58 when the restraining member 92 is in other than it restraining position (FIG. 7), and is biased for receipt in the lock pin opening 71 when the restraining member 92 is in its restraining position. As such, the end 130 of the lock pin 126 generally slides along the rear side 69 of the body 58 until it reaches the lock pin opening 71, whereupon it moves automatically under the bias of the spring member 142 into the lock pin opening 71. When desired, the pull device 134 may be pulled to disengage the end 130 of the lock pin 126 from the lock pin opening 71, thereby allowing the restraining member 92 to be moved from its restraining position to its receiving position.

In use, the apparatus 10 is readily attached to the platform 16 of the trailer 12 by first creating an opening in the platform 16 sized to receive the support member 22 therethrough. The platform 16 presents a surface adjacent the opening to abut the mount plate 20 and base plate 50. Holes are formed through the platform 16 for alignment with the openings 24 in the mount plate 20 and the base plate 50. The fasteners 28 are then used to secure the mount fixture 18 to the platform 16, as discussed above. It should be recognized that though the apparatus 10 is shown attached to a generally horizontal platform 16, that it is contemplated to attach the apparatus 10 to a platform of a trailer other than a horizontal platform, such as a vertical platform or wall (not shown), for example. Further, it should be recognized that the apparatus 10 could be constructed for direct attachment to the upper surface of the platform 16 without having the support member 22 passing through an opening.

With the mount fixture 18 secured to the platform 16, the body 58, with the restraining member 92 received thereon, can be inserted to the desired position within the passage 38 of the support member 22. When adjusted to the desired height, the adjustment pin 48 is secured through the openings 44 in the support member 22 and the adjustment openings 70 in the body 58. Generally, the body 58 is adjusted to a predetermined height so that the A-arm 88, for example, engages the cam surface 87 on the flange 78. As shown in FIG. 1, a pair of the apparatus 10 is preferably used per vehicle 14 to capture separate A-arms 88 on the vehicle 14.

With the restraining members 92 in their receiving positions (FIG. 3), a first gap (G1) is defined between the free ends 112 of the fingers 104 and the cam surfaces 87 of the flanges 78 to allow the vehicle 14 to be positioned in its desired relation relative to the front sides 80 of the bodies 58. As the A-arms 88 of the vehicle 14 are brought into engagement with the cam surfaces 87, the cam surfaces 87 tend to bias the vehicle 14 toward the platform 16 (FIG. 6), thereby bringing the vehicle 14 into secure engagement with the platform 16. As such, any movement of the vehicle 14 relative to the platform 16 is resisted. Upon bringing the vehicle 14 into engagement with the bodies 58, the bodies 58 act as positive stops to prevent inadvertent movement of the vehicle 14 beyond the intended location for attachment to the platform 16. Accordingly, the bodies 58 provide an additional safety mechanism to prevent accidental, unintentional movement of the vehicle 14 off the trailer 12. In addition, the bodies 58 may also act to prevent unwanted shifting of the restrained vehicle 14 during sudden stops of the trailer 12, such as may occur in an accident, for example.

With the vehicle 14 properly positioned relative to the apparatus 10, the restraining members 92 may be moved slidingly upward to their restraining positions. This is done by exerting an upwardly directed force on the individual restraining members 92, thereby causing the lock pins 126 to slide along the rear sides 69 of the respective bodies 58 until they reach their respective lock pin openings 71. Upon reaching the lock pin openings 71, the lock pins 126 automatically extend from their retracted disengaged positions to their extended engaged positions under the biasing force imparted by the spring members 142. With the restraining members 92 locked in their restraining positions, a second gap (G2) is defined between the free ends 112 of the fingers 104 and their respective cam surfaces 87, wherein the second gaps (G2) are less than the first gaps (G1). The second gaps (G2) are predetermined to prevent movement of the portion of the vehicle 14 between the gaps (G2), and preferably, the second gaps (G2) are reduced to present an entirely enclosed opening about the portion of the vehicle being captured by the apparatus 10. This results from the free ends 112 of the fingers 104 extending through the openings 90 in the flanges 78. As such, the A-arms 88 are fully enclosed and captured within the openings 124, until otherwise intentionally released.

With the free ends 112 of the fingers 104 extending through the respective openings 90 in the flanges 78, further unwanted movement of the restrained vehicle 14 relative to the trailer 12 is provided. For example, if the vehicle 14 is suddenly biased rearwardly relative to the apparatus 10, the captured A-arm 88 will abut the fingers 104, thereby causing the fingers 104 to positively engage a surface defining the openings 90 within the flanges 78. As such, the fingers 104, bodies 58 and the flanges 78 operate together to positively restrain the vehicle 14 in its intended position. This may be especially important during a sudden acceleration condition of the trailer 12, such as may result if the trailer 12 is rear ended by another vehicle, for example. Of course, the same principle applies if there is unwanted sudden rearward movement of the restrained vehicle 14 relative to the apparatus 10. The restraining members 92 remain in their restraining positions until intentionally moved therefrom. As mentioned above, the pad lock 76, or the like, may be inserted in the openings 74 adjacent the restraining members 92 to prevent unwanted movement of the restraining members 92 from their restraining positions, thereby preventing the removal of the restrained vehicle 14 from the apparatus 10.

To remove the vehicle 14 from the apparatus 10, the user need only reverse the steps above. Upon pulling the pull device 134 and moving the restraining members 92 to their receiving position, the vehicle 14 may be removed from the trailer 12. The bodies 58 further act to prevent accidental movement of the vehicle 14 from other than the proper rearward direction while unloading the vehicle 14 from the trailer 12. Additionally, upon removing the vehicle 14 from the trailer 12, it should be understood that the body 58 and the restraining members 92 may be removed from the mount fixture 18 (FIG. 1A), as desired, to allow the trailer 12 to be used other than for transporting the vehicle 14, or to allow the vehicle 14 to be moved off the trailer 12 in a generally forward direction, if desired. Of course, if desired, the mount fixtures 18 may also be removed and reattached to the trailer 12 as needed.

The embodiments discussed above are intended to be illustrative of some presently preferred embodiments of the invention, and are not limiting. Various modifications within the spirit and scope of the invention will be readily apparent to those skilled in the art. The invention is defined by the claims that follow.

I claim:

1. A vehicle restraint apparatus, comprising:
    a body having a flange extending outwardly therefrom; and
    a restraining member received for slidable movement along at least a portion of the body between a receiving position and a restraining position, the restraining member having a finger extending outwardly therefrom to a free end for movement of the free end relative to the flange to define a first gap between the finger and the flange when the restraining member is in its receiving position and disposed on the body and a second gap between the finger and the flange when the restraining member is in its restraining position, the first gap being greater than the second gap, the first gap providing open access to receive a portion of the vehicle between the flange and the finger while the restraining member remains disposed on the body and the second gap providing a substantially enclosed opening to restrain the portion of the vehicle between the flange and the finger.

2. The apparatus of claim 1 wherein the flange has an opening sized to receive the free end to define the substantially enclosed opening between the flange and the finger as being completely enclosed when the restraining member is in its restraining position.

3. The apparatus of claim 1 further comprising a lock housing carried by the restraining member with the lock housing having a lock pin movable between an extended position to prevent slidable movement of the restraining member relative to the body and a retracted position to allow sliding movement of the restraining member relative to the body.

4. The apparatus of claim 3 wherein the body has a lock pin opening sized to receive the lock pin when in its extended position, the lock pin opening being positioned in the body so that when the restraining member is in its restraining position, the lock pin is aligned for receipt in the lock pin opening to prevent slidable movement of the restraining member relative to the body.

5. The apparatus of claim 4 further comprising a spring member biasing the lock pin toward its extended position to automatically move the lock pin within the lock pin opening when the restraining member is moved to its restraining position.

6. The apparatus of claim 1 wherein the flange has a cam surface with an obtuse included angle being defined between the body and the cam surface.

7. The apparatus of claim 1 further comprising a support member sized to slidably receive the body.

8. The apparatus of claim 7 further comprising an adjustment pin, at least one adjustment opening in the body and an opening in the support member arranged for generally concentric alignment with said at least one adjustment opening in the body, the adjustment pin being sized for receipt in the concentrically aligned openings to maintain the body in an axially fixed relation relative to the support member.

9. The apparatus of claim 7 further comprising a mount plate extending outwardly from the support member.

10. The apparatus of claim 9 further comprising a base plate operably attachable to the mount plate in a generally parallel spaced relation therefrom.

11. The apparatus of claim 1 wherein the body has an opening positioned along the body so that when the restraining member is in its restraining position, the opening is exposed adjacent a surface of the restraining member, the opening being sized for receipt of a lock member to prevent moving the restraining member from its restraining position.

* * * * *